United States Patent [19]

Mattis et al.

[11] 3,980,887

[45] Sept. 14, 1976

[54] SILICON SENSITIZED RARE EARTH OXYSULFIDE PHOSPHORS

[75] Inventors: James J. Mattis, Long Valley; Melvin Tecotzky, Mendham, both of N.J.

[73] Assignee: U.S. Radium Corporation, Morristown, N.J.

[22] Filed: Apr. 11, 1975

[21] Appl. No.: 567,200

Related U.S. Application Data

[60] Division of Ser. No. 392,108, Aug. 27, 1973, Pat. No. 3,904,546, which is a continuation-in-part of Ser. No. 185,891, Oct. 1, 1971.

[52] U.S. Cl. ............................ 250/483; 252/301.4 S
[51] Int. Cl.² ................................................ G01T 1/00
[58] Field of Search ....................... 250/483, 486; 252/301.4 S

[56] References Cited
UNITED STATES PATENTS

| | | | |
|---|---|---|---|
| 3,738,856 | 6/1973 | Masi | 250/483 X |
| 3,829,700 | 8/1974 | Buchanan et al. | 250/483 |
| 3,872,309 | 3/1975 | DeBelder et al. | 250/483 |

Primary Examiner—Archie R. Borchelt
Attorney, Agent, or Firm—Pennie & Edmonds

[57] ABSTRACT

Rare earth oxysulfide phosphors with excellent optical properties and optimum particle size control for use as photoluminescent, cathodoluminescent and X-ray luminescent phosphors are prepared by treating a solution of at least one salt of a rare earth metal and a salt of a rare earth activator to form solid salts and thereafter heating the oxidic compound with a sulfidizing agent and a silicon sensitizer, preferably in the presence of a fluoride. The rare earth oxysulfide phosphors thus obtained contain from 10 to 1,000 p.p.m. silicon sensitizer and, if used, 20 to 500 p.p.m. fluoride, incorporated in the crystal lattice structure.

3 Claims, No Drawings

SILICON SENSITIZED RARE EARTH OXYSULFIDE PHOSPHORS

This is a division, of application Ser. No. 392,108 filed Aug. 27, 1973, now U.S. Pat. No. 3,904,546, which is a continuation-in-part of application Ser. No. 185,891, filed Oct. 1, 1971.

BACKGROUND OF THE INVENTION

1. Field of the Invention

This invention relates to rare earth phosphors. More particularly, the invention relates to a method for preparing such phosphors (generally in association with a rare earth activator) which involves a treatment with a silicon-containing sensitizer material, and to the resultant rare earth phosphors (and associated activator) incorporating retained sensitizer and, optimally, fluorine. The term "rare earths" as used in the present specification refers to yttrium and scandium plus the metals in Group III of the Periodic Table generally classified as lanthanide rare earths, to wit: lanthanum, cerium, praseodymium, neodymium, samarium, europium, gadolinium, terbium, dysprosium, holmium, erbium, thulium, ytterbium and lutetium. The term "phosphor" refers to a material which is capable of exhibiting luminescence when subjected to appropriate excitation. The term "rare earth activator" refers to compounds of rare earth elements which may be combined with other rare earth compounds to activate luminescence thereof, including, for example, compounds of europium, terbium, erbium, thulium, dysprosium, ytterbium and prasodymium.

2. Description of the Prior Art

Luminescent properties of certain rare earth-containing compositions have long been recognized. In recent years, rare earth phosphors have received considerable attention and have been the subject of many intensive investigations. The recent interest is due partly to the discovery that certain rare earth phosphors, particularly the oxygen-bearing phosphors (oxyphosphors) can be used advantageously as cathodoluminescent coatings for color television tubes. In general, the rare earth phosphors are in the form of a solid solution having a matrix of rare earth compounds such as a rare earth oxide or vanadate and an activator which is commonly called a "dopant" and generally is also a rare earth element.

The effectiveness of the activator is dependent to a large extent on its intimate relation within the rare earth matrix. To insure the formation of an intimate mixture, rare earth phosphor manufactures may prefer to dissolve into an acid solution the rare earth element in the form of an oxide, together with the activator, to form a homogeneous solution. The rare earth element and the activator are then coprecipitated from solution in the form of oxalate, hydroxide, carbonate or sulfate. The precipitate may be recovered and fired at a high temperature to decompose the salts into mixed oxides in powder form. This finely divided, reactive form is favorable for reaction with certain oxy-acids to synthesize such oxygen-dominated and europium-activated phosphors as yttrium vanadate, gadolinium vanadate, yttrium tungstate, yttrium germanate, gadolinium aluminate, etc., and conditions can be adjusted to yield desirable crystal growth and particle size distribution. The phosphors thus synthesized may be used as luminescent coatings for color television tubes and other applications.

Prior art methods reported for preparing various rare earth activated oxysulfides and prior art disclosures of various rare earth activated oxysulfide phosphors are to be found in U.S. Pat. Nos. 2,402,547; 3,418,247; 3,418,246; 3,423,621; 3,502,590; 3,515,675; 3,562,174; and 3,563,909. Many of these methods involve the reaction of a rare earth compound with a sulfur-containing gas at an elevated temperature to form the oxysulfide. Still another technique reported, only for the preparation of europium activated lanthanum, gadolinium, yttrium and lutetium oxysulfides, is the solid state reaction between the mixed rare earth oxides (activator and host) and a composition such as alkali metal carbonates and sulfur which produces alkali metal sulfides and polysulfides, which in turn react at elevated temperatures with the rare earth oxides to form the rare earth oxysulfides. In addition to the alkali metal carbonate, it is reported that an alkali metal sulfate, phosphate, arsenate, or germanate may be used.

U.S. Pat. No. 3,415,757 discloses fluoro-substituted europium activated gadolinium, yttrium and lanthanum oxide phosphors (oxyfluorides) having a fluorine content lying between 0.1 and 5.0% by weight. These products are made by heating a mixture of rare earth oxides with ammonium fluoride, or preferably europium fluoride.

Although the phosphors described above are being employed as luminescent coatings for color television tubes and in other applications, these phosphors do not generally have the combined properties of being free flowing, having high brightness and controlled particle size. The methods described above do not suffice for controlling the crystal growth properly, and generally lead to wide particle size distribution or result in crystal growth at the expense of lowering the phosphors optical properties.

SUMMARY OF THE INVENTION

Through the use of a silicon sensitizer, preferably together with a fluoride, and using solid state techniques, we have been able to develop a synthetic procedure for producing oxysulfide phosphors in which a small quantity of the sensitizer, and fluorine, if used, are incorporated in the oxysulfide lattice and which form well defined, non-aggregated phosphor crystals. The phosphors produced are free-flowing and show unusually high brightness when excited by ultraviolet radiation, cathode rays, and X-rays. The new phosphors are eminently suited for use in aircraft cockpit cathode ray displays and other such displays that must be viewed under intense ambient light conditions. By controlling the amount of silicon sensitizer and fluoride and the temperature of preparation, we have grown sensitizer-containing and sensitizer- and fluoride-containing, rare earth oxysulfide crystals larger than 20 microns in size.

Broadly stated, the process of the present invention comprises treating a homogeneous solution of at least one salt of a rare earth host metal selected from lanthanum, gadolinium and yttrium, and a salt of at least one rare earth activator selected from terbium, europium, praseodymium, erbium, ytterbium, neodymium, thulium and dysprosium, to decompose the salts to form therefrom an oxidic compound of the rare earth metal and activator. A mixture containing the oxidic compound, a sulfidizing agent, and a silicon sensitizer, with or without a fluoride, is then heated to a temperature in the range from 650° to 1350°C. to form crystalline rare earth oxysulfide phosphor containing about 10 to 1,000 p.p.m. silicon, and 20 to 500 p.p.m. of fluorine, if used, incorporated in the crystal lattice.

Preferably, the rare earth oxidic compound is prepared by the process which comprises the steps of preparing a homogeneous solution of at least one rare earth host metal salt and at least one activator salt. The rare earth host metal and the activator preferably are then coprecipitated. After the precipitate is recovered, it is fired to cause formation of the oxidic rare earth compound.

The silicon sensitiver, and the fluorine if used, can also be introduced into the oxysulfide by treating a homogeneous solution of at least one salt of a rare earth host metal, at least one salt of a rare earth activator, and a silicon compound, and optionally a fluoride salt, to decompose the salts to form therefrom an oxidic silicon and, if used, fluoride-containing compound of said rare earths. A mixture containing said compound with a sulfidizing agent is then heated at a temperature from about 650° to 1350°C. to form a rare earth oxysulfide phosphor in crystalline form containing about 10 to 1,000 p.p.m. silicon and when used, 20 to 500 p.p.m. fluorine, incorporated in the crystal lattice.

The rare earth oxysulfide phosphors of the present invention consist essentially of a rare earth oxysulfide matrix of the formula $R_2O_2S$ wherein R is a rare earth host element of the group consisting of lanthanum, gadolinium and yttrium, with a rare earth activator of the group consisting of praseodymium, neodymium, samarium, europium, terbium, dysprosium, holmium, erbium, ytterbium and thulium in an amount from 0.1 to 10% by weight of the phosphor incorporated in said matrix, and with the small amount previously noted of silicon and, optionally, fluorine, incorporated in said matrix. These phosphors are useful as photoluminescent and cathodoluminescent phosphors for color television and specialty cathode ray tube applications. Particularly advantageous phosphors are those in which the host matrix is yttrium or gadolinium oxysulfide and the rare earth activator is europium or terbium. In the case of terbium-activated phosphors, the presence in combination with the terbium of a small concentration of dysprosium, say 10 to 100 parts per million, is often advantageous.

DESCRIPTION OF THE PREFERRED EMBODIMENTS

To carry out the process of this invention, the initial steps of forming an intimate mixture containing the rare earth metal values for the phosphor matrix and the activator in predetermined proportions may be accomplished by conventional techniques well known to one skilled in the art. Thus, one may obtain a homogeneous solution by dissolving therein the soluble compounds of rare earth elements as well as the activator. In general, the sulfates, nitrates and chlorides are the rare earth compounds most commonly used to prepare the homogeneous solution.

The amount of rare earth matrix salt and activator salt that is dissolved in the solvent is not critical. The maximum amount of rare earth that can be used is generally governed by the solubility of the compounds in the solvent. When a mineral acid is used as a solvent, the concentration of the acid dictates the concentration of the solutes therein.

Advantageously the proportion of the matrix rare earth and the activator in the solution is in substantially the same stoichiometric ratio as in the final phosphor product. The amount of activator in the phosphor varies within a wide range depending on a number of factors. If desired, two or more activator rare earths may be used in combination with the matrix rare earth, as is known in the art.

The rare earth element and the activator are coprecipitated from the homogeneous solution by adding thereto a precipitating agent well known in the art. Thus, the coprecipitation may be accomplished by adding to the solution oxalic acid, tartaric acid, or ammonium carbonate to precipitate therefrom oxalates, tartrates and carbonates, respectively.

In the process of this invention, we prefer to use oxalic acid to coprecipitate the desired rare earth metal values from the solution. This may be performed, for example, by adding an oxalate or oxalic acid solution to the homogeneous solution containing the matrix rare earth values and the activator. The mixing of oxalic acid with the solution may be carried out over a wide temperature range, e.g., 10° to 70°C. The pH of the resultant aqueous mixture, however, preferably is adjusted, for example, to a value of about 2 to 3, so that it is below the value at which the rare earth hydroxides precipitate.

The initial concentration of the solution, the amount of the oxalic acid added thereto, the pH of the final solution and the temperature for the coprecipitation all have influences on the type of crystals obtained and the size of the crystals. In general, it is advantageous to adjust these variables so as to effect a coprecipitation that will produce phosphors with optimal properties.

The rare earth coprecipitate thus obtained is recovered by digesting and filtration followed by washing and drying. The coprecipitate is then fired at a temperature sufficiently high to cause formation of the respective rare earth oxides. Generally, firing the recovered coprecipitates at a temperature of 550° to 1350°C. is eminently suitable for the conversion of the salts to rare earth oxides. The product thus obtained is now ready for treatment to convert the oxide to the oxysulfide phosphors of the invention.

The sensitizer to be used is silicon or a silicon compound. The silicon sensitizer can, for example be added to the reaction in the form of elemental silicon, or as $SiO_2$ in any desired form such as colloided silica, or in the form of other silicon compound (e.g. an alkali metal silicate silicon sulfide, or any other siliceous material which does not introduce undesirable elements into the phosphor product) which will react to include silicon in the phosphor lattice structure. If fluorine is also to be included, then both silicon and fluorine can be added to the reaction in the form of a silicofluoride, such as $Na_2SiF_6$ or fluosilicic acid.

The treatment is performed by heating together a well mixed mixture containing the above-mentioned rare earth oxides and silicon sensitizer, a sulfidizing agent, and optionally; a compound containing fluorine, to form a rare earth oxysulfide phosphor containing 10 to 1,000 p.p.m. of silicon and, when used, 20 to 500 p.p.m. of fluorine. The heating of the mixture may be carried out within a range of temperatures which we have found may be from 650° to 1350°C.

The particular fluoride compound used to incorporate the fluorine within the lattice structure of the phosphor can be selected from numerous fluorine-containing compounds. Preferably it comprises a fluoride of an alkali metal or ammonium, and it may with advantages be included in a mixture containing potassium phosphate. For example, it may be provided as $K_3PO_4 + NaF + NH_4Cl$, or $NH_4F$, or $NH_4F.HF$, or $LiF$, or $NaF$, or $KF.2H_2O$, or $NaF + KF.2H_2O$, or a fluoride of the rare earth host. However, the particular fluoride compound used is by no means limited to these particular chemical compounds; it may comprise any other fluoride compound or mixtures thereof known in the art.

In order to form the oxysulfide phosphor from the oxide phosphor, it is necessary to heat the oxide phosphor with a sulfidizing agent. So far as this invention is concerned, any of the sulfur bearing materials or combination of sulfur-bearing materials which are known in the art for converting rare earth oxides to rare earth oxysulfides may be used. For example, elemental sulfur, alkali metal sulfides and polysulfides, rare earth sulfides, hydrogen sulfide, organic sulfides, alkali thiocyanates, alkali sulfates plus carbon, etc., may be used. Elemental sulfur is preferred.

We have also found that silicon and fluorine can be introduced into combination with the rare earth components prior to the sulfidizing treatment. Therefore, a second embodiment of the method of the present invention comprises the initial steps of forming an intimate mixture of a homogeneous solution containing the matrix rare earth metal salt and the rare earth activator salt in pre-determined proportions as described above. To the solution containing rare earth values is added a silicon compound, and optionally a fluoride-containing solution in which there is dissolved, for example, $NH_4F.HF$, HF, NaF, or other soluble fluoride. When a fluoride is used and the solution is prepared or held in a glass container, sufficient silicon (upwards to 10 p.p.m. but generally less than 1,000 p.p.m.) is incorporated in the solution by leaching from the glass walls of the container to make it unnecessary to add a silicon compound from any other source.

The resulting solution of rare earths, containing a silicon compound and fluoride, is treated to coprecipitate the rare earth from the homogeneous solution, and the coprecipitate is recovered in the same manner as described above. The recovered coprecipitate is then converted to rare earth oxides containing silicon and fluorine by firing the coprecipitate at a temperature of 550° to 1350°C.

A mixture comprising the resulting silicon and fluorine-containing rare earth oxides and a sulfidizing agent is then heated within a temperature range of 650° to 1350°C. to convert the oxide to a rare earth oxysulfide containing 10 to 1,000 p.p.m. silcon and 20 to 500 p.p.m. fluorine in the crystal lattice. We have found that by incorporating the fluorine in this manner rather than by adding a fluoride to the already prepared rare earth oxides, the particle size of the crystals may be held to about six microns while still maintaining very high luminous efficiency.

Incorporating silicon, and optionally fluorine, in the matrix of rare earth phosphors as above described improves the luminescent efficiency of the resultant phosphors.

The oxysulfide phosphors according to the invention and as herein above described advantageously conform in composition, it is believed, to the formula $M_{2-x}O_2S:xA$ in which M is the matrix (host) rare earth element, A is the rare earth activator, and $x$ is 0.001 to 0.1, the phosphor being modified by incorporation into the crystal lattice structure of 10 to 1,000 p.p.m. of silicon and, if used 20 to 500 p.p.m. of fluorine. Particularly advantageous phosphors of this character are those in which M is yttrium or gadolinium, and A is europium or terbium.

The phosphors according to the present invention may be used as photoluminescent, cathodoluminescent and X-ray luminescent phosphors. Particular phosphors may be especially suitable for particular uses. Thus, for example, a cathode ray tube including a red-luminescent viewing screen comprising a substrate may be coated on a surface thereof with a plurality of rare earth oxysulfide particles of a matrix of yttrium oxysulfide or gadolinium oxysulfide having as an activator europium and incorporating in the matrix structure from 10 to 1000 p.p.m. silicon and, if used, 20 to 500 p.p.m. of retained fluorine. An X-ray intensifying screen may comprise a substrate coated on a surface thereof with a plurality of rare earth oxysulfide particles composed of a matrix of yttrium oxysulfide or gadolinium oxysulfide having as an activator terbium, advantageously also including 10 to 100 p.p.m. (based on phosphor weight) of dysprosium and incorporating from 10 to 1000 p.p.m. silicon and if used, 20 to 500 p.p.m. of retained fluorine in the matrix structure.

The rare earth oxysulfide phosphors in accordance with this invention have, as previously stated, retained silicon and, if used, fluorine which are incorporated within the lattice structure of the phosphor. The precise manner in which these atoms are associated with and bonded to the rare earth oxysulfide matrix is not clear. However, we have found by analysis that these atoms are in fact incorporated in the lattice structure of the phosphor crystal and are not present merely in the form of simple residues of the added silicon compound and fluoride compound added. The presence of these atoms in the rare earth oxysulfide crystal structure is important to achieve the improved phosphor brightness and controlled crystal growth which characterize the new product. The literature contains numerous references to rare earth oxygen-fluoride compounds and rare earth sulfur-fluoride compounds, but so far as we are aware no rare earth oxygen-sulfur-silicon-fluorine phosphor structures have heretofore been known.

The invention is further described in detail in the following examples for illustrative purposes:

EXAMPLE 1

Four mixtures of 550 grams $Ba_2O_3$ containing 0.2% $Tb_2O_3$ and 10 p.p.m. $Dy_2O_3$, 110 grams of $Na_2CO_3$, 110 grams of sulfur and 63.3 grams of $K_3PO_4$ were prepared. Three of the mixtures contained additional reagents as described below:

a. To one mixture was added $5 \times 10^{-4}$ mole $SiO_2$ per mole of rare earth oxide. The silica was added in the form of commercially available colloidal silica.

b. A second mixture was made to contain $1 \times 10^{-3}$ mole $SiO_2$ per mole of rare earth oxide.

c. The third mixture contained $1 \times 10^{-3}$ mole $SiO_2$ and $1.1 \times 10^{-2}$ gram atom F per mole of oxide, added as $NH_4HF_2$ d. The fourth mixture did not contain any added fluorine or silicon compounds.

All four of the mixtures were fired in covered alumina crucibles for 4½ hours at 2000°F., and the resultant phosphors were excited and tested for luminescence efficiency (brightness).

The following table gives the results of this experiment:

| Amount of Si or F Compound Added | Luminescence Efficiency |
|---|---|
| a) 0.05 mole % $SiO_2$ | 107 |
| b) 0.1 mole % $SiO_2$ | 108 |
| c) 0.1 mole % $SiO_2$ + 1.1 mole %F | 108 |
| d) None | 100 |

EXAMPLE 2

Three mixtures of the following chemicals were prepared in a blender: 550 grams $Gd_2O_3$ containing 0.2% $Tb_2O_3$ and 10 p.p.m. $Dy_2O_3$, 110 grams $Na_2CO_3$, 110 grams sulfur and 63.3 grams of $K_3PO_4.nH_2O$. Each of the mixtures was treated with additional reagents as described below:
  a. One mixture was made to contain $5 \times 10^{-4}$ mole Si per mole of rare earth oxide. The silicon was added in the form of the compound $Na_2SiF_6$.
  b. To the second mixture was added $5 \times 10^{-4}$ mole Si per mole of rare earth oxide. The silicon in this case was in the form of $SiO_2$.
  c. The third mixture contained $5 \times 10^{-4}$ mole Si and $3.2 \times 10^{-2}$ mole F per mole of rare earth oxide. The additives were added as $SiO_2$ and $NH_4HF_2$.

All three preparations were fired in covered alumina crucibles for 4½ hours at 2,100°F. and then tested for brightness as in Example 1.

The following table gives the results of this experiment:

| Si or F Compound Added | Luminescence Efficiency |
|---|---|
| a) $Na_2SiF_6$ | 106 |
| b) $SiO_2$ | 100 |
| c) $SiO_2.NH_4HF_2$ | 106 |

The low luminescence efficiency in this Example of the product produced by adding $SiO_2$ to the rare earth mixture, as compared with the similar product of Example 1, was the result of using gadolinium oxide in Example 2 instead of lanthanum oxide as in Example 1. In the case of lanthanum oxysulfide phosphors, silicon can be incorporated with relative ease. With gadolinum and yttrium oxysulfide phosphors, incorporation of silicon is difficult in the absence of fluorine.

EXAMPLE 3

A mixed solution containing 4950 milliliters of 0.6-molar $GdCl_3$, 63 milliliters of 1-molar $TbCl_3$, 2.4 milliliters $DyCl_3$ solution (corresponding in concentration to 5 grams $Dy_2O_3$/liter) and 34 milliliters of $NH_4F.HF$ solution containing 0.041 grams F/ml was prepared in a glass container and stirred for 16 hours. The temperature of the solution was brought to 30°C. and 7750 milliliters of 10% oxalic acid was added in three equal portions, waiting 5 minutes between each addition. The resulting precipitate was then digested while stirring for 30 minutes. In the course of this treatment some amount between 10 and 1,000 p.p.m. of silicon was leached from the walls of the glass container and incorporated in the precipitate.

The resulting coprecipitate was filtered and washed with deionized $H_2O$. The washed coprecipitate was dried for 16 hours at 550°F. and thereafter was fired for 3½ hours at 2,150°F. to form a silicon and fluorine containing oxide.

To this oxide was added $Na_2CO_3$, sulfur and $K_3PO_4$ and the mixture was converted to a terbium-dysprosium activated silicon and fluorine-containing gadolinium oxysulfide phosphor by first mixing, milling, and mixing the mixture and then firing the mixture in 250 cc. alumina crucibles covered with porcelain lids and covered with large silica crucibles for 4½ hours at 2,100°F.

EXAMPLE 4

A mixed solution containing 10,080 milliliters of 0.6-molar $GdCl_3$ solution. 12.6 milliters of $TbCl_3$ solution (conforming in concentration to 173 grams $Tb_2O_3$/liter), and 4.8 milliliters of $DyCl_3$ solution (conforming in concentration to 5 grams $Dy_2O_3$/liter) was prepared and diluted to 10,100 milliliters. The resulting solution was divided into four equal parts of 2525 milliliters each in glass containers and treated as follows:
  a. One 2525 milliliter portion was brought to a temperature of 30°C. and while being stirred a total of 3875 milliliters of 10% oxalic acid was added in three equal portions at 5 minute intervals. The resulting coprecipitate was digested for 30 minutes, filtered and washed with deionized $H_2O$. The coprecipitate was dried at 550° and fired at 2,150°F. for 3½ hours. Thereafter 100 grams of the fired oxide phosphor was mixed and milled with 20 grams of $Na_2CO_3$, 20 grams sulfur and 11.5 grams of $K_3PO_4$. The resulting mixture was converted to terbium-dysprosium activated gadolinium oxysulfides as described in Example 1.
  b. To a second 2525 milliliter portion was added 34 milliliters of a $NH_4F.HF$ solution containing 0.041 grams F/ml. The solution was digested for 16 hours with stirring. Thereafter, the solution was precipitated and digested as in part (a) above. In the course of this treatment some amount between 10 and 1,000 p.p.m. of silicon was leached from the glass container and incorporated in the precipitate. The precipitate was calcined to oxide and converted to a silicon- and fluorine-containing oxysulfide in the same manner as described in part (a) hereinabove.
  c. To a third 2525 milliliter portion was added 68 milliliters of the $NH_4F.HF$ solution and the resulting solution was precipitated, calcined and converted to a silicon- and fluorine-containing oxysulfide as described in part (b).
  d. To the last 2525 milliliters of the solution described in part (a) was added 102 milliliters of the $NH_4F.HF$ solution, and the resulting solution was precipitated, calcined and converted to a silicon- and fluorine-containing oxysulfide as described in part (b).

The silicon- and fluorine-containing oxysulfide phosphors produced in accordance with parts (b), (c), and (d), when coated on a cathode ray tube screen and excited by an electron beam of the same energy in each case were all notably brighter than the silicon- and fluorine-free oxysulfide phosphor made in accordance with part (a) and correspondingly excited. Furthermore, as the concentration of fluorine increased in the phosphor of parts (b), (c), and (d), respectively, so did the particle size of the phosphors.

EXAMPLE 5

The mixed solution containing 8,080 milliliters of 0.6 molar $YCl_3$, 9.65 milliliters of 1-molar $TbCl_3$ and 54.6 milliliters of $NH_4F.HF$ containing 0.041 grams F/ml. or 0.41%F. was prepared and stirred for 16 hours in a glass container.

Thereafter the temperature of one-half of the solution was brought to 30°C. and 5450 milliliters of 10% oxalic acid was added in three equal portions, waiting 5 minutes between each addition. The resulting coprecipitate contained fluorine and some amount from 10 to 1000 p.p.m. of silicon leached from the glass container wall by the fluoride. It was stirred for 30 minutes, filtered and washed with deionized water. The wash coprecipitate was dried at 220°F. and thereafter was fired for 3½ hours at 2,150°F.

To the remaining one-half of the mixed solution was added an additional 27.3 milliliters of $NH_4F.HF$ containing 0.041 grams F/ml. for a total fluoride ion concentration of 0.82%. The resulting solution was then coprecipitated and the coprecipitates fired in the same manner as described in the preceding paragraph.

To 270 gram samples of each of the above-prepared silicon- and fluorine-containing oxide phosphors were separately added 86.7 grams sodium carbonate, 86.7 grams sulfur and 50 grams $K_3PO_4$. These two batches of ingredients were then fired to form silicon- and fluorine-containing oxysulfide phosphors in the same manner as described in Example 4.

The terbium-activated yttrium oxysulfide phosphors made with 0.41%F. added had a particle size of 6.34 microns whereas the phosphors made with 0.82%F. added had a particle size of 6.8 microns. Both of these silicon- and fluorine containing phosphors showed high brightness of bluewhite color when excited by electrons in a cathode ray tube.

EXAMPLE 6

A mixed solution containing 5620 milliliters of 0.6 molar $LaCl_3$, 6.75 milliliters $13TbCl_3$, 2.4 milliliters $DyCl_3$ of concentration equivalent to 5 grams $Dy_2O_3$/liter, and 38.6 milliliters $NH_4F.HF$ containing 0.041 g/ml of F was prepared and stirred for 16 hours in a glass container.

Thereafter, the temperature of the solution was brought to 50°F. and 7750 milliliters of 10% oxalic acid was added. The resulting coprecipitates, containing occluded silicon (from the glass container wall) and fluoride as discussed in the previous Examples, were stirred for 30 minutes, filtered and washed with deionized water. Thereafter, the coprecipitates were dried at 550°F. and fired for 3 hours at 2,150°F. to form a silicon- and fluoride-containing oxide phosphor.

To 278.5 grams of the oxide phosphor was added 55.2 grams $Na_2CO_3$, 55.2 grams sulfur and 19.5 grams $K_3PO_4$. These ingredients were mixed, milled and mixed again. Thereafter, the ingredients were placed in covered alumina crucibles and fired for 3 hours at 2100°F.

The terbium-dysprosium activated lanthanum oxysulfide phosphors produced by this method contained somewhere between 10 and 1,000 p.p.m. silicon and about 100 p.p.m. fluorine, had a particle size of 9.89 microns and exhibited bright yellow-green luminescence on cathode ray excitation.

EXAMPLE 7

A mixed solution containing 5620 milliliters 0.6-molar $LaCl_3$, 6.75 milliliters 1-molar $TbCl_3$ (0.2 mole %), 2.4 milliliters $Dy_2O_3$ containing 5 grams $Dy_2O_3$ (22 p.p.m.) and 77.2 milliliters $NH_4F.HF$ containing 0.041 g/ml of F (about 0.6%) was prepared and stirred for 16 hours in a glass container.

Thereafter, the temperature of the solution was controlled to 50° F. and 7,750 milliliters of 10% oxalic acid were added. The resulting coprecipitates were stirred for 30 minutes, filtered and washed with deionized water. Thereafter, the coprecipitates, containing silicon leached from the glass container wall and fluorine, were dried at 550°F. and then fired for 3 hours at 2,150°F. to form silicon- and fluoride-containing oxide phosphor. To 276 grams of this oxide phosphor was added 54.6 grams $Na_2CO_3$, 54.6 grams sulfur and 19.3 grams $K_3PO_4$. These ingredients were mixed, milled and mixed again. Thereafter the ingredients were placed in covered alumina crucibles and fired for 3 hours at 2,100°F.

The terbium-dysprosium activated lanthanum oxysulfide phosphors produced by this method contained somewhere between 10 and 1,000 p.p.m. silicon and about 100 p.p.m. of fluorine in the crystal lattice, had a particle size of 10.5 microns, and exhibited bright yellow-green luminescence on cathode ray excitation.

EXAMPLE 8

Two separate mixed solutions each containing 10,080 milliliters of 0.6-molar $GdCl_3$, 12 milliliters of 1-molar $TbCl_3$, 4.8 milliliters $DyCl_3$ solution containing the equivalent of 5g/l $Dy_2O_3$, and 136 milliliters $NH_4F.HF$ containing 0.041 g/ml (0.5%F) were prepared and stirred for 16 hours in a glass container. The temperature of the solutions was adjusted to 30°C. and 7,750 milliliters of 10% oxalic acid was added in three equal parts with a five minute interval between each addition. The resulting coprecipitate containing silicon and fluorine was stirred for 30 minutes, filtered and then washed with deionized water. Thereafter, the coprecipitate was dried at 550°F. and then fired for 3½ hours at 2,150°F.

a. To 350 grams of the resulting oxide was added 50 grams $Na_2CO_3$, 50 grams sulfur, 28.8 grams $K_3PO_4$, 7.17 grams NaF and 2.7 grams $NH_4Cl$, and the ingredients were mixed.
b. The same mixture was prepared as in part (a) except that only 3.85 grams NaF and 1.38 grams $NH_4Cl$ were used.
c. The same mixture was prepared as in part (a) except that 2.5 grams of $NH_4F.HF$ was used instead of NaF and $NH_4Cl$.

The composition of parts (a), (b), and (c) were treated individually by mixing, milling, and mixing the ingredients and thereafter by being fired in covered alumina crucibles and 4½ hours at 2100°F.

All three terbium-dysprosium activated gadolinium oxysulfide phosphors containing silicon and fluorine prepared above exhibited pale yellow-green emission when excited by electrons, X-rays, and 2537A ultraviolet. The particle size and fluoride concentration in the crystal lattice of the samples produced in parts (a), (b), and (c) was found to be as shown in the following table:

| Phosphor | Particle Size (Microns) | Fluoride Concentrations (p.p.m.) |
|---|---|---|
| a) | 17.6 | 65 |
| b) | 13.9 | 25 |
| c) | 12.97 | 20 |

The above table illustrates that the fluoride concentrations found correlate with the amount added. There is also an increase in particle size with increasing fluoride concentration.

While the fluoride addition is not in all cases essential, it is preferred in order to facilitate forming the silicon-containing oxysulfide phosphors of the rare earth metals gadolinium and yttrium.

While it is not precisely understood how the silicon and (if used) fluorine substitute in the phosphor matrix, they are present therein and their presence demonstrably effects a large increase in the luminescence efficiency (brightness) of the phosphors.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:

1. An X-ray intensifying screen comprising a substrate having coated on a surface thereof a plurality of particles of a rare earth oxysulfide phosphor consisting essentially of a rare earth oxysulfide matrix of the formula $M_{2-x}O_2S:xA$ wherein M is at least one rare earth element selected from the group consisting of lanthanum, gadolinium and yttrium, A is at least one rare earth activator selected from the group consisting of praseodymium, neodymium, samarium, europium, terbium, dysprosium, holmium, erbium, ytterbium, and thulium, and $x$ is 0.001 to 0.1, silicon incorporated in said matrix in an amount from about 10 to 1,000 p.p.m. based on phosphor weight and, when M is gadolinium or yttrium, fluorine incorporated in said matrix in an amount from about 20 to 500 p.p.m.

2. An X-ray intensifying screen according to claim 1 wherein the phosphor particles are crystalline compounds having the formula $$Y_{(2-x)}Tb_xO_2S$$

wherein $x$ is 0.001 to 0.1, modified by incorporation into the crystal lattice of 10 to 1,000 p.p.m. of silicon and 20 to 500 p.p.m. of fluorine.

3. An X-ray intensifying screen according to claim 1 wherein the phosphor particles are crystalline compounds having the formula $$Gd_{(2-x)}Tb_xO_2S$$

wherein $x$ is 0.001 to 0.1, modified by incorporation into the crystal lattice of 10 to 1,000 p.p.m. of silicon and 20 to 500 p.p.m. of fluorine.

* * * * *